United States Patent Office 3,272,710
Patented Sept. 13, 1966

3,272,710
ANTIANDROGENIC COMPOSITIONS AND
METHODS OF USE
Leonard J. Lerner, New Brunswick, and Frank L. Weisenborn, Somerset, N.J., assignors to E. R. Squibb & Sons, Inc., New York, N.Y., a corporation of Delaware
No Drawing. Filed Oct. 21, 1965, Ser. No. 500,286
8 Claims. (Cl. 167—74)

This application is a continuation-in-part of application Serial No. 267,935, filed March 26, 1963, and now abandoned, which is a continuation-in-part of application Serial No. 47,593, filed August 5, 1960, and now abandoned.

This invention relates to compositions which possess important physiological activity. More particularly, this invention relates to pharmaceutical preparations containing A-nor-5β-pregnane-2,20-dione.

It has been found in accordance with the present invention that the novel compound A-nor-5β-pregnane-2,20-dione is a physiologically active substance which exhibits a marked anti-androgenic activity. More particularly, it has been found that preparations containing A-nor-5β-pregnane-2,20-dione are effective therapeutic agents for the treatment of hyperandrogenic conditions in animal species, e.g., prostatic hypertrophy. They are surprisingly superior to known compounds of similar structure.

A-nor-5β-pregnane-2,20-dione is prepared in good yield by a process which comprises hydrogenating A-nonprogesterone by reacting A-norprogesterone with hydrogen in the presence of a hydrogenation catalyst. While the reaction can be carried out in any suitable solvent medium, in the preferred practice of this invention the solvent medium employed is ethanol. Examples of other suitable solvents are methanol, ethyl acetate and benzene.

The hydrogenation can be effected in the presence of various known hydrogenation catalysts, such as the noble metal catalysts. Thus, it is possible to employ palladium or platinum, preferably on a suitable carrier, such as carbon or alumina.

To prepare therapeutic compositions embodying the active medicament of this invention, A-nor-5β-pregnane-2,20-dione is incorporated in various pharmaceutical preparations by mixing an effective amount thereof with a suitable proportion of a compatible non-toxic pharmaceutical carrier. Illustratively, the formulation may comprise tablets or two-piece gelatin capsules for peroral administration, prepared by mixing the compound with solid carriers, such as starches, gums, talcs, sugars, cellulose derivatives and the like; or isotonic liquid preparations for parenteral administration, prepared by suspending the compound in water and adjusting the salinity of the resulting suspension. The compound can also be administered in other known dosage-unit forms, suitable for oral or parenteral administration, such as aqueous suspensions or solutions in oils such as sesame oil, corn oil or castor oil, the A-nor-5β-pregnane-2,20-dione preferably being present in such concentration as to provide a dosage of about 5 mg. to about 100 mg. of steroid per unit. In addition, ointments or lotions may be used for topical treatment.

In therapeutic use the anti-androgenic preparations of the present invention are administered at an initial dosage of from about 100 mg. to about 1000 mg. daily, followed by a maintenance dosage regime of from about 100 mg. to about 500 mg. daily. The dosages, however, may be varied depending upon the requirements of the animal species.

The following examples are illustrative of the preparation of the novel compound of the present invention and of therapeutic compositions embodying this compound but are not to be construed as limiting the scope thereof.

EXAMPLE 1

A-nor-5β-pregnane-2,20-dione

A solution of 250 mgs. of A-nonprogesterone in 50 ml. of ethanol is hydrogenated over 600 mgs. of 5% palladium-charcoal catalyst. Absorption of one molar equivalent of hydrogen is complete in 18 hours. At the end of this period, the catalyst is filtered off, the solution concentrated to dryness and the residue is crystallized from ethyl acetate-hexane to give about 155 mgs. of A-nor-5β-pregnane-2,20-dione, M.P. about 135–136° C., $[\alpha]_D + 14.4°$ (chloroform);

$\lambda_{max}^{Nujol}$ 5.77μ, 5.86μ.

Analysis: Calcd. for $C_{20}H_{30}O_2$: C, 79.42; H, 10.00. Found: C, 79.37; H, 9.92.

EXAMPLE 2

To prepare 100 tablets, each containing 50 mg. of A-nor-5β-pregnane-2,20-dione, the following ingredients are used:

|   | G. |
|---|---|
| A-nor-5β-pregnane-2,20-dione | 5.0 |
| Dicalcium phosphate | 3.6 |
| Lactose | 6.0 |
| Corn starch | 1.8 |
| Granulating paste (corn starch in water, 11% in weight) | 0.2 |
| Distilled water (about) | 2.3 |
| Talc | 0.3 |
| Magnesium stearate | 0.04 |

A tablet granulation is prepared from these ingredients by passing the steroid through a 100-mesh screen; the dicalcium phosphate, lactose and corn starch are passed through a 60-mesh screen; the screened materials are intermixed; the granulating paste and sufficient water are worked in to give a pasty consistency, and the material passed through a large mesh (e.g., No. 16) screen to produce granules. The granules are tray dried at 130° F. for three hours; and the dry granulation is put through a No. 20 (to 24) screen and mixed with the previously sieved talc and magnesium stearate. The remaining granulation is compressed into tablets, each containing about 50 mg. of A-nor-5β-pregnane-2,20-dione.

EXAMPLE 3

The following ingredients are for the preparation of 100 dry-filled capsules, each containing 50 mg. of A-nor-5β-pregnane-2,20-dione:

|   | G. |
|---|---|
| A-nor-5β-pregnane-2,20-dione | 5.0 |
| Lactose | 97.0 |
| Magnesium stearate | 0.8 |

These ingredients are uniformly intermixed in conventional manner and filled into two-piece hard gelatin capsules to provide capsules each containing 50 mg. of the A-nor-5β-pregnane-2,20-dione.

EXAMPLE 4

An aqueous sterile suspension of A-nor-5β-pregnane-2,20-dione providing an effective dose of 50 mg. of A-nor-5β-pregnane-2,20-dione per mg. is prepared by combining the following ingredients:

|   | G. |
|---|---|
| A-nor-5β-pregnane-2,20-dione | 50.5 |
| Benzyl alcohol | 9.0 |
| Sodium chloride | 6.6 |
| Carboxymethylcellulose | 5.5 |
| Methylcellulose | 0.75 |
| Water, q.s. 1.0 liter. | |

In preparing the above composition, the sodium chloride, carboxymethylcellulose and methylcellulose are added to 100 cc. of water with atendant stirring. The A-nor-5β-pregnane-2,20-dione and benzyl alcohol are then added with accompanying agitation. Sufficient water is then added to bring the volume to one liter. The resultant suspension is then metered into vials of the selected size as, for example, 10 cc. vials, from which it can be withdrawn for therapeutic application, as by intramuscular administration.

EXAMPLE 5

A cream base is prepared from the following ingredients (the proportions are on a weight basis):

| | Percent |
|---|---|
| Cetyl alcohol | 5 |
| Glycercyl monostearate | 8.5 |
| Spermaceti | 5 |
| Isopropyl palmitate | 2 |
| Tween 60 | 3 |
| Propylene glycol | 5 |
| Methylparaben | 0.2 |
| Propylparaben | 0.02 |
| Distilled water, q.s. | 100 |

A-nor-5β-pregnane-2,20-dione, wetted with propylene glycol and water is gradually worked into the cream base to provide 10 mg. of active ingredient per 100 mg. of composition.

EXAMPLE 6

An injectable composition is prepared by thoroughly admixing 100 gm. of A-nor-5β-pregnane-2,20-dione with 1 liter of sesame oil and the preparation is subdivided into single dosage vials each containing the active component in a potency of 100 mg/ml.

The invention may be variously otherwise embodied within the scope of the appended claims.

What is claimed is:
1. A-nor-5β-pregnane-2,20-dione.
2. A pharmaceutical composition comprising about 5 to 500 mg. of A-nor-5β-pregnane-2,20-dione and a major proportion of a pharmaceutically acceptable carrier therefor.
3. A pharmaceutical composition comprising about 25 to 250 mg. of A-nor-5β-pregnane-2,20-dione and a major proportion of a pharmaceutically acceptable carrier therefor.
4. A composition as in claim 3 wherein the carrier is lactose.
5. A composition as in claim 3 wherein the carrier is carboxymethylcellulose.
6. A composition as in claim 3 wherein the carrier is sesame oil.
7. A pharmaceutical composition for topical application comprising A-nor-5β-pregnane-2,20-dione in an ointment base supplying about 5 mg. to 50 mg. of A-nor-5β-pregnane-2,20-dione per 100 mg. of composition.
8. A process for producing an anti-androgenic effect which comprises administering to an animal species having a hyper-androgenic condition a composition comprising A-nor-5β-pregnane-2,20-dione in a pharmaceutical carrier therefor in a dosage of about 25 mg. to 250 mg.

No references cited.

JULIAN S. LEVITT, *Primary Examiner.*

MARTIN J. COHEN, *Assistant Examiner.*